368-108 SR
OR RE 22,570
Search Room

Nov. 28, 1944. F. LUX Re. 22,570

TIMER Orig. No. 2,300,950

Original Filed Feb. 25, 1941 4 Sheets-Sheet 1

Inventor

Frederick Lux

By Bachman & Burton

Attorneys

61. TIME CONTROLLING MECHANISM,

Search Room

Nov. 28, 1944. F. LUX Re. 22,570

TIMER

Original Filed Feb. 25, 1941 4 Sheets-Sheet 2

Inventor

Frederick Lux

By Rockwell & Berkelman

Attorneys

Search Room

Nov. 28, 1944. F. LUX Re. 22,570

TIMER

Original Filed Feb. 25, 1941 4 Sheets-Sheet 3

Inventor

Frederick Lux

By Rockwell, Berthelson

Attorneys

61. TIME CONTROLLING MECHANISM
Search Room

Nov. 28, 1944. F. LUX Re. 22,570

TIMER

Original Filed Feb. 25, 1941 4 Sheets-Sheet 4

Inventor

Frederick Lux

By Rockwell & Burton

Attorneys

Search Room

Reissued Nov. 28, 1944

Re. 22,570

UNITED STATES PATENT OFFICE 22,570

TIMER

Frederick Lux, Waterbury, Conn., assignor to The Lux Clock Manufacturing Company, Inc., Waterbury, Conn., a corporation of Connecticut Original No. 2,300,950, dated November 3, 1942, Serial No. 380,465, February 25, 1941. Application for reissue May 29, 1944, Serial No. 537,831

18 Claims. (Cl. 161—1)

This invention relates to timers, and more particularly to a timer which may be employed to control the operation of a switch or some other member which it is desired to move at predetermined intervals, or in a step-by-step movement. As shown, the timer is employed to control the movements of an electric switch to both open and close said switch, although it will be understood that the particular construction is not limited to this function, but may be employed in various other relations where it is desired to effect the movement of a control member.

The timer illustrated in the present application is clock-operated, that is, it is combined with a clock mechanism which is designed to indicate the hours as well as to indicate the period during which the switch will occupy an "on" position. While the particular power employed to operate the clock is not of importance in the application, as illustrated the clock is designed to be operated electrically. It will be understood, however, that certain of the novel features of the invention may be employed in a timer per se as well as with a combined timer and clock.

In the past devices of this character have been relatively complicated and expensive, and in particular it has been necessary when constructing an "on and off" timer to employ two sets of mechanisms which were substantial duplicates of each other, one to operate the movable member to "on" position and the other set acting to move the member to "off" position. In the present arrangement such duplication of elements is avoided, and one movable controlling member is provided which is controlled in a step-by-step fashion to first move the mechanism to "on" position and thereafter to "off" position.

One object of the present invention is to provide a timer mechanism of relatively simple construction.

A further object of the invention is to provide a timer mechanism in which the position of a single movable member is controlled by the timer in a step-by-step fashion, the first movement of the member actuating a switch or the like to an "on" position, and the second movement thereof serving to move the switch to "off" position.

A still further object of the invention is the provision of a combined clock and timer, the latter being operated by the clock mechanism, which will be of simple construction and which therefore may be relatively economical to manufacture.

A still further object of the invention is to provide improved and simplified mechanism to actuate the switch or other controlled member, and which will in turn be actuated by the clock mechanism, and to provide improved indicating means which may cooperate with the clock face to indicate at once the period of time during which the switch or other member will be permitted to remain in "on" position.

To these and other ends the invention consists in the novel features and combinations of parts to be hereinafter described and claimed.

Figure 1:
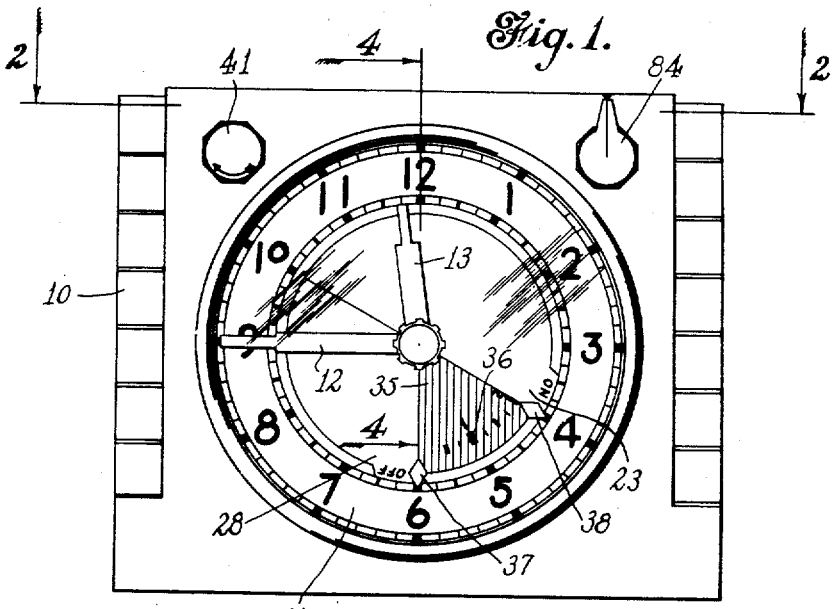
Fig. 1 is a front elevational view of a combined clock and timer embodying my invention.

To illustrate a preferred embodiment of my invention, I have shown a clock mechanism comprising a case 10 having a dial 11 and the usual minute and hour hands 12 and 13. The clock is adapted to be operated through reduction gearing designated generally by the numeral 14, which in the present instance is designed to be powered by the motor 15, which may be either a spring or electric motor, preferably the latter.

As the foregoing mechanism may be of conventional character, it is unnecessary to describe the same in detail. It will suffice to say that the clock mechanism is supported upon spaced plates A and B in a usual manner, and that the motor through the reduction gearing 14 serves to rotate the shaft 16 (Fig. 4) upon which the minute hand 12 is mounted. Secured to this shaft is a pinion 17 in mesh with a gear 18, which gear is in turn secured to a relatively wide pinion 19. The teeth of the pinion 19 are in turn in mesh with those of a gear 20 rigidly mounted upon a sleeve 21 surrounding the shaft 16, which sleeve carries the hour hand 13.

Surrounding the sleeve 21 is a sleeve 22, which sleeve passes through the dial 11 of the clock face and carries rigidly on its outer end the "on" setting disk 23. Also secured to the rear end of the sleeve 22 is a pinion 24 through which, as will be hereinafter described, the disk 23 may be set to a given position.

Secured to the sleeve 22 so as to rotate therewith is a control disk 25 having a peripheral notch or recess 26 at one point therein, the purpose of which will be hereinafter described.

Surrounding the sleeve 22 is a further sleeve 27 which projects through the clock dial and carries upon its outer end the "off" setting disk 28, the sleeve 27 also carrying a setting pinion 29 and a control disk 30 having a peripheral notch or recess 31. The disks 25 and 30 are substantially alike in construction, and may be spaced apart by a washer 32. The setting disks 23 and 28, together with the sleeves upon which they are mounted, are frictionally held in any position to which they may be turned by means of a spring washer 33 between the clock dial and the disk 28, and a second spring washer 34 between the face of the sleeve 27 and the disk 23. In practice the friction exerted by the washer 33 is greater than that exerted by the washer 34, so that when the disk 23 is turned or set the position of the disk 28 will not be disturbed.

Figure 13:
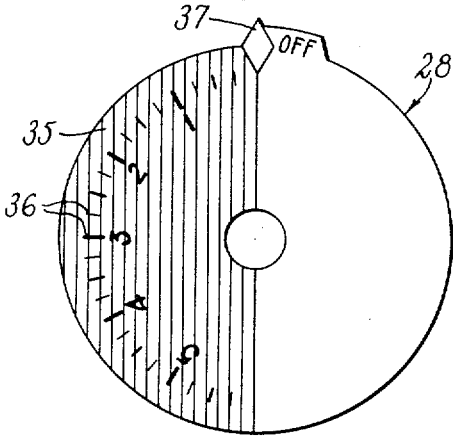
Fig. 13 is a front elevational view of the "off" indicating disk.
Figure 14:
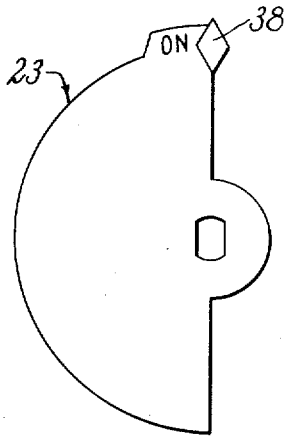
Fig. 14 is a similar view of the "on" indicating disk.
Figure 15:
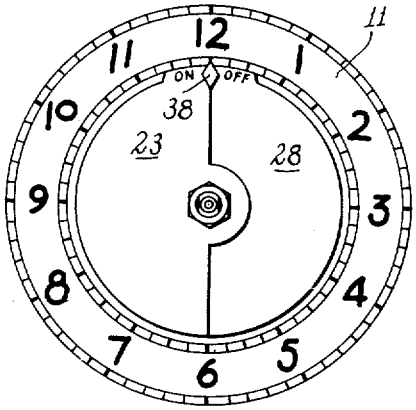
Fig. 15 is a detail view of the face of the clock showing the "on" and "off" disks in inoperative position.
Figure 16:
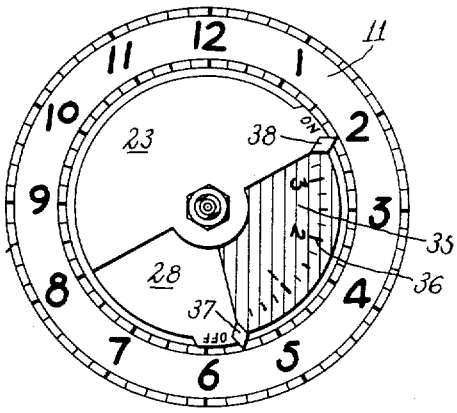
Fig. 16 is a view similar to Fig. 15 showing the indicating disks when they have been set for a predetermined operation.

As shown in Fig. 13, the disk 28 may have a portion thereof colored to contrast with the remainder, and with the color of the disk 23. As shown, substantially one half of the disk is colored red, as at 35, and may have spaced indicating marks 36 corresponding with those of a portion of a usual clock dial. That is, if one half of the disk 28 is colored red, this portion will be marked off into six hour spaces, each hour space being subdivided if desired. This disk is also provided with a pointer 37 which will cooperate with the numerals on the clock dial to indicate the time at which the switch or other member may be actuated to "off" position. As shown in Fig. 14, the disk 23 may be of substantially semicircular form and provided with a pointer 38 to cooperate with the indicia on the clock dial to indicate the time of moving the switch to "on" position. As will be seen from Fig. 15, for example, the pointers 37 and 38 may be set in registration, at which time the colored portion 35 of the disk 28 will be completely covered by the disk 23, and at this time the recesses or notches 26 and 31 will be in registration. As further shown in Fig. 16, the disks may be rotated to any desired position, for instance, to turn the switch on at two o'clock and to turn it off at five-thirty o'clock. In this position of the members, a part of the colored portion of the disk 28 will be exposed to view, and this colored portion will extend over that portion of the dial of the clock during which period the switch will occupy the "on" position. That is, the operator, by observing the face of the clock, will be immediately informed as to the period during which the switch will be on, by the extent of the colored portion of the dial 28 which is exposed.

Figure 2:
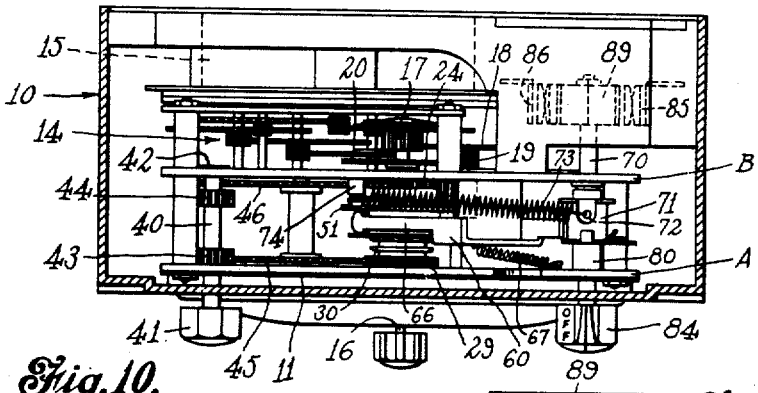
Fig. 2 is a horizontal sectional view on line 2—2 of Fig. 1.

Referring to Fig. 2, a setting shaft 40 is mounted in the plates A and B for longitudinal movement, this shaft having a turn button 41 on the outer end thereof, and being spring pressed toward its outer position, shown in Fig. 2, by a spring 42 bearing against the end of the shaft behind the plate B. Upon the shaft 40 are a pair of pinions 43 and 44. In the outer position of the shaft the pinion 43 is designed to engage a gear 45 which is at all times in mesh with the pinion 29 of the "off" setting disk 28, so that in this position of the parts rotation of the button 41 will turn this disk to any desired position. When the shaft 41 is pressed inwardly by pressure upon the button 41 against the action of the spring 42, the pinion 44 engages a gear 46, which gear is in mesh with the pinion 24 on the sleeve 22 of the "on" setting disk 23, so that this disk may likewise be turned to any given position. It will be understood that the spacing of the pinions 43 and 44 is less than that of the gears 45 and 46, so that when the pinion 43 is engaged with its gear 45, the pinion 44 will be disengaged from the gear 46, and vice versa, thus permitting the setting of one disk independently of the other. It may also be stated that as the notched disks 25 and 30 rotate with the setting disks 23 and 28, the notches 26 and 31 will always bear a position related to that of the pointers 37 and 38.

Figure 4:
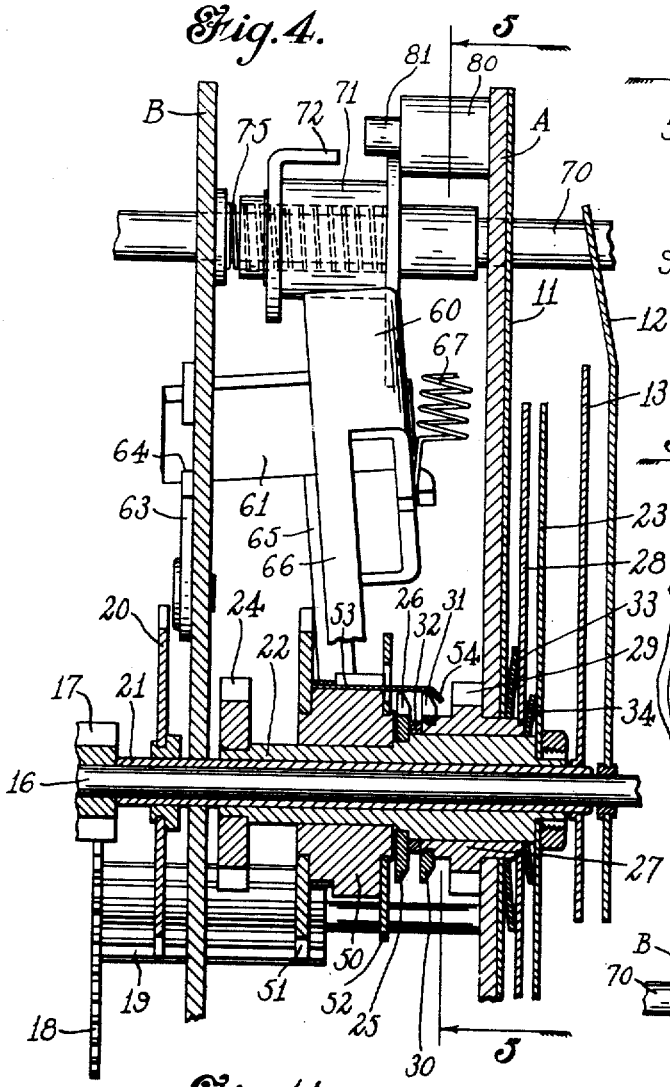
Fig. 4 is a partial vertical sectional view on line 4—4 of Fig. 1.
Figure 8:
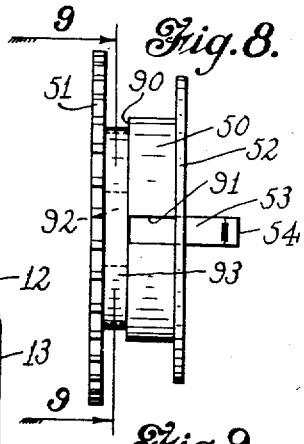
Fig. 8 is a detail view of the movable controlling member.
Figure 9:
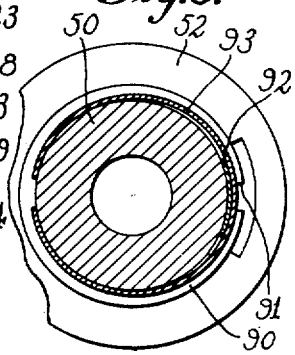
Fig. 9 is a detail sectional view on line 9—9 of Fig. 8.

Slidably and rotatably mounted upon the sleeve 22 is a hub 50 to one end of which is secured a gear 51, the teeth of which are in mesh with the pinion 19, so that this hub will in the present instance be rotated at a speed corresponding to that of the hour hand of the clock, the gear 51 being of the same size as the gear 20. This hub and associated parts constitute the controlling or actuating member of the timer which serves to cause the actuation of the switch or other member to "on" and "off" positions. Secured at the end of this hub opposite the gear 51 is a disk 52 through and from which projects a spring arm 53 secured to the hub, this arm having a bent end 54. It may be noted that the arm 53 clears the outer peripheral edges of the disks 25 and 30, so that the hub 50 may rotate in the position of the parts shown in Fig. 4 without interference from the disks. However, the bent end 54 turns inwardly to a sufficient extent so that when this end is in registration with the recesses 26 and 31, it will pass therethrough, the width of the spring arm 53 being slightly less than that of the notches in the disks. It will be also apparent, as the description proceeds, that it is necessary to move the hub 50 to the left, as shown in Fig. 4, even when the notches 26 and 31 are not in registration with the arm 53. This can be readily accomplished as the resilience of the arm 53 is such that it will spring upwardly so that the bent end 54 will ride over the outer periphery of the disks when the hub 50 is thus moved.

Figure 5:
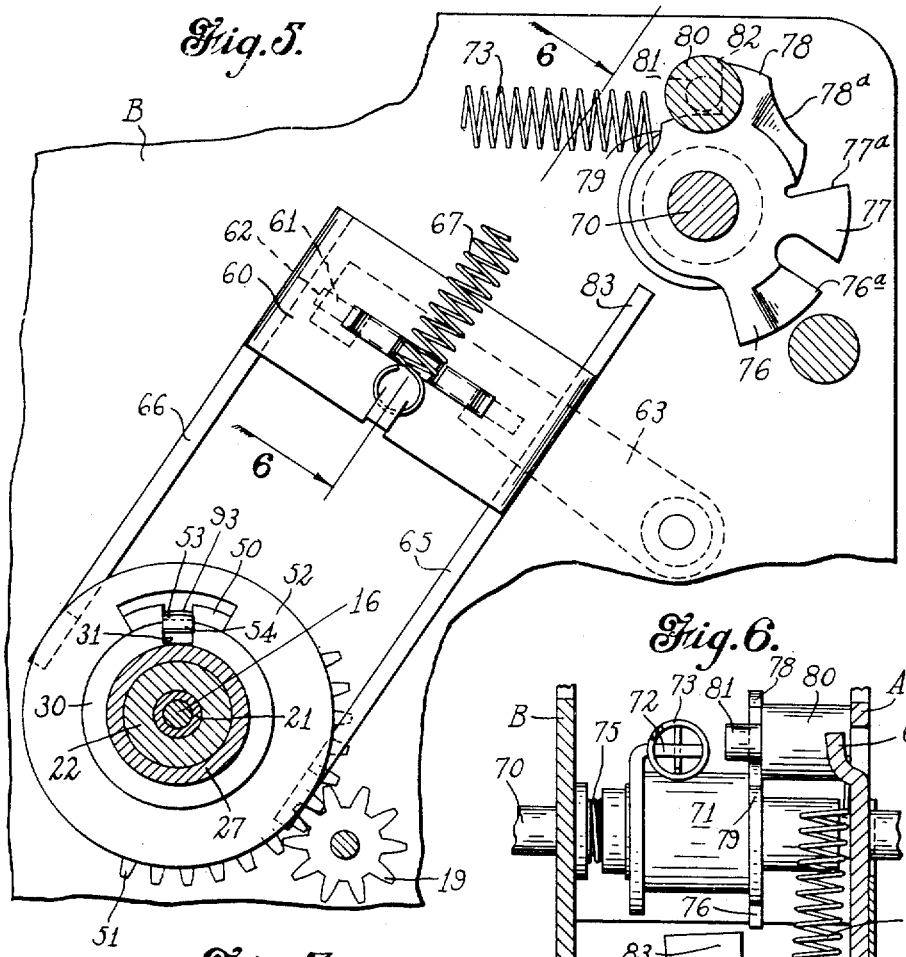
Fig. 5 is a sectional view on line 5—5 of Fig. 4.
Figure 6:
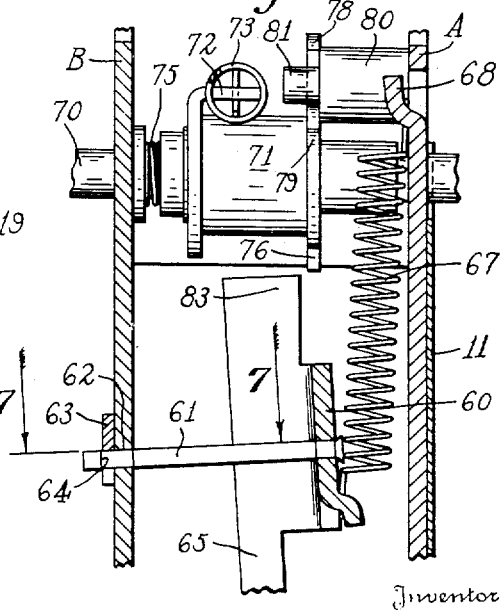
Fig. 6 is a sectional view on line 6—6 of Fig. 5.
Figure 7:
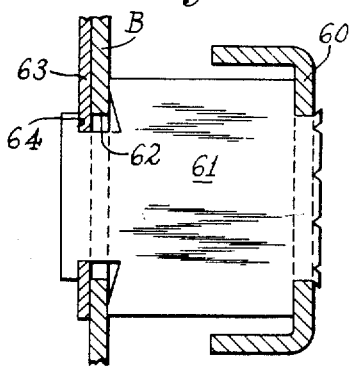
Fig. 7 is a sectional view on line 7—7 of of Fig. 6.

An actuating yoke 60 provided with a laterally extending portion 61 is pivotally carried by the plate B, as shown in Figs. 4, 5 and 7. The end of the member 61 is substantially T-shaped in form, Search Room and projects through a slot 62 in the plate so as to be held in position by a swinging arm 63 having a notch 64 to engage the reduced portion of the member 61 behind the plate. This yoke member is provided with arms 65 and 66 which lie between the gear 51 and disk 52, so that the yoke will be swung about its pivot in the plate B when the hub 50 is moved axially, and vice versa, the hub, however, being rotatable freely between the arms 65 and 66. This yoke member is spring pressed outwardly at its lower end, as shown in Figs. 4 and 6, by means of the tension spring 67 secured to the member below the pivot, and secured at its upper end at 68 to the plate B so that the lower end of the yoke and the hub 50 will be urged toward the right or toward the position in which it is shown in Fig. 4.

This yoke 60 serves to control in a step-by-step movement the rotation of a shaft 70 rotatably and slidably mounted in the plates A and B, as shown more especially in Figs. 4, 5 and 6. Secured to this shaft is a hub 71 upon which is mounted an arm 72 to which is secured one end of a spring 73, the other end being secured to a post 74 on the plate B, so that this spring tends to rotate the shaft in a counterclockwise direction. A spring 75, acting between a portion of the hub and the plate B, serves to normally urge the shaft 70 outwardly or to the right, as shown in Fig. 4. Also secured to the hub 71 are a plurality of stop arms 76, 77 and 78, in addition to a detent 79 arranged on one end of the hub itself.

Secured to the plate A is a stop member 80 having a reduced end 81, the latter of which is adapted to be engaged by the edge 82 of the arm 78, while the larger portion 80 of the stop member is adapted to be engaged by the detent 79 to hold the member 70 in predetermined position, as will be hereinafter explained. The upper end of the yoke member 60 is provided with an arm 83, which is adapted to engage the arms 76 and 77, and thus control rotation of the shaft 70 in a step-by-step movement, according to the position of the yoke 60, which is in turn controlled by the axial position of the hub 50 on the sleeve 22. This position of the hub will be in turn controlled by the cooperation of the arm 53 and the disks 25 and 30, as will be hereinafter explained.

Figure 3:
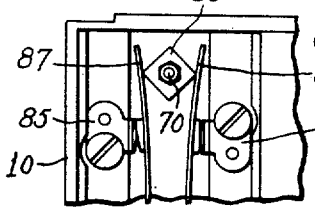
Fig. 3 is a detail view of the switch mechanism.

While the particular switch mechanism is not important in all aspects of the invention, I have shown in Fig. 3 a switch comprising fixed contacts 85 and 86 adapted to be engaged by movable spring contacts 87 and 88, respectively, the spring members 87 and 88 being so tempered as to be normally urged toward each other or away from the contacts 85 and 86 when not pressed outwardly by a non-circular member 89 mounted upon the shaft 70. It will be understood that when the member 89 is turned so that its parallel sides are toward the members 87 and 88, these members will be disengaged from the fixed contacts 85 and 86, and the switch will be open. When, however, the vertices of the member 89 engage the members 87 and 88, as shown in Fig. 3, the members 87 and 88 will be forced outwardly and the switch will be in "on" position. As shown, a movement of the shaft 70 through an angle of 45° moves the switch from "off" to "on" position, and vice versa. Upon the shaft 70 is provided a manipulating button 84 by which the shaft may be rotated and also moved longitudinally.

Any suitable means may be employed to secure the arm 53 to the hub 50. In the present instance, however, I provide the hub with a peripheral groove or recess 90, and an axial recess 91. The arm 53 is of T-shaped formation, having a head 92 disposed within the recess 90, while the body of the arm lies in the recess 91. The head is held in place by means of a split spring ring 93 which may be snapped into the recess over the head of the arm.

It is desirable in devices of this character to be able to set the timer either for automatic or manual control, the latter being employed when it is desired to control the current passing through the switch by means other than the timing mechanism. This is provided in the present instance by longitudinal movement of the shaft 70. When this shaft is moved inwardly, or to the left, as shown in Fig. 4, the surface 82 of the arm 78 engages the reduced portion 81 of the stop, as shown in Fig. 5. In this position the switch arms 87 and 88 are thrown outwardly, as shown in Fig. 3, so as to close the contact points and permit the current to flow so that the flow may be manually controlled by other means. This position of the shaft 70 shown in Fig. 5 is the extreme counterclockwise position of the shaft. When it is rotated through approximately 45° in a clockwise direction from the position shown in Fig. 5, the shoulder 79 will catch upon the enlarged portion 80 of the stop, the shaft being moved to the right (Fig. 4) by the spring 75, and the shaft 70 will be held in this position, opening the switch and thus arranging the device for automatic control. It will be noted that the arm 76 is provided with a portion 76ª offset axially of the shaft 70 with reference to the member 77, and also that the arm 78 is provided with a cam edge or surface 78ª for a purpose which will now be described.

The position of the parts shown in Figs. 4 and 5, for example, may be considered a normal position thereof, which is the position in which the device stands when arranged for manual control. If it is desired to control the switch by the timing mechanism, the knob or button 41 is rotated, which, as has been previously described, rotates the "off" setting disk 28 until the pointer 37 is opposite the clock time at which it is desired to have the current shut off. The button 41 is then moved inwardly to engage the pinion 44 with the gear 46 to rotate the "on" setting disk 23 until the pointer 38 indicates the time at which it is desired that the current be turned on. For example, in Fig. 1 of the drawings the device is set for the current to be turned on at four o'clock and off at six, while in Fig. 16 the setting is such that the current will be turned on at two o'clock and off at five-thirty. In either case the period about the clock dial during which the current will flow will be indicated precisely by the colored portion of the disk 28 which is exposed, so that the operator is readily aware of any error which might have been made in the setting, and this portion of the disk also bears indicia which shows the length of time during which the current will be on. This setting of the disks 23 and 28 will likewise rotate the disks 25 and 30, so that the notches or recesses 26 and 31 will be rotated to a position relating to the pointers 37 and 38, which position in the present construction is in a position directly opposite these pointers respectively.

Figure 10:
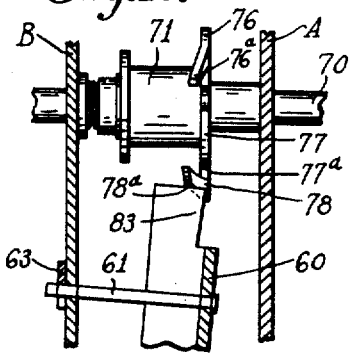
Fig. 10 is a detail view of the switch-operating mechanism.
Figure 11:
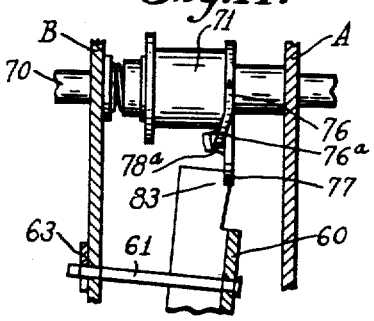

After the pointers have been set the knob 84 is rotated in a clockwise direction in Figs. 1 and 5. During this rotation the arms 76 and 77 pass by the arm 83, but the upper end of the latter is engaged by the surface 78ª, as shown in Fig. 10, thus moving the upper end of the yoke 60 in a downward and outward direction about its pivotal support in the plate B. This moves the lower end of the yoke, and therefore the hub 50, to the left from the position shown in Fig. 4. It will be understood that the disks 25 and 30 have been moved so that the notches 26 and 31 are no longer opposite the end 54 of the arm 53. This, however, will not prevent the movement of the hub 50 to the left, as the arm 53 is resilient and will merely spring upwardly, permitting the end 54 to ride upwardly over the edges of the disks. When the hub 50 has been moved sufficiently far to the left, as it will be, for the end 54 of the arm 53 to clear the disk 25, it will snap downwardly until its outer end engages the inner face of this disk, and thus prevent the hub 50 and lower end of the yoke 60 being moved to the right under the tension of spring 67. The operator then releases the button 84 and the spring 73 will turn the shaft 70 in a counterclockwise direction until the edge 77[a] of the arm 77 strikes against the portion 83 of the yoke. This is the position of the parts shown in Fig. 11, and the mechanism is now set for its next operation, which will be to turn the current on at the proper time, for in the position of the parts just described the member 89 is in a position at an angle of 45° from that shown in Fig. 3, and the contact members are not in engagement.

Figure 12:
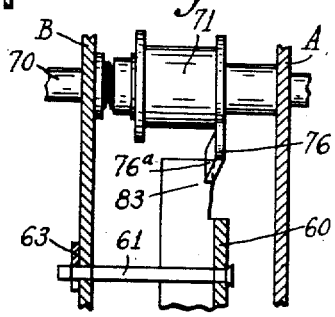
Figs. 11 and 12 are views similar to Fig. 10, showing different positions of this mechanism.

As has been explained, the hub 50 is rotated by the clock mechanism in synchronization with the hour hand of the clock, and carries with it the arm 53. When, therefore, the clock has run to the point where the end 54 of this arm registers with the notch 26, it will move through this notch under force of the spring 67, thus permitting the hub 50 to move toward the right, as shown in Fig. 4. This movement of the hub and lower end of the yoke toward the right will move the upper end of the yoke toward the left, so that the arm 83 will be disengaged from the edge 77[a] of the arm 77, and permit the shaft 70 to be rotated through an angle of approximately 45° until the edge of the portion 76[a] of the arm 76 is engaged by the arm 83, as shown in Fig. 12. The offsetting of the portion 76[a] permits this result, as, while the arm 83 is moved sufficiently far to the left (Figs. 11 and 12) to disengage the arm 77, it will still be engaged by the offset portion 76[a] of the arm 76. This movement of the shaft 70 results in setting the cam member 89 in the position shown in Fig. 3, and making the contact to turn the current on.

When the clock mechanism, which continues to run, has progressed to the point at which the end 54 of the arm 53 registers with the notch 31, the arm will pass through this notch, thus allowing the hub 50 to be moved another step to the right, or to its extreme right-hand position, as shown in Fig. 4, by the spring 67. This will serve to move the arm 83 another step to the left from the position shown in Fig. 12, until the portion 76[a] of the arm 76 is released from engagement with the part 83. This permits a further rotation in a counterclockwise direction of the shaft 70 under impulse of the spring 73, until the surface 79 engages the enlarged portion 80 of the stop member, and serves to turn the current off, which completes the cycle of operation.

If it is now desired to close the switch so that the device controlled by the switch may be operated manually, the button 84 is pushed inwardly, which releases the portion 79 from the enlarged portion 80 of the stop, and results in the engagement of the surface 82 by the reduced part 81 of the stop, which permits a further turn of the shaft 70 to close the switch, as shown in Fig. 3. It will be seen that, whereas usually two control members are provided, which control members are operated in sequence to actuate the switch or other member controlled by the timer, I have provided a single controlling or actuating member comprising the hub 50 and associated parts, and that this member is given a step-by-step movement along the sleeve 22 due to the control thereof by the notched disks 25 and 30, the positions of which are controlled by the positions of the setting disks 23 and 28. It will also be seen that by permitting outward movement of the arm 53 under spring pressure, the disks 25 and 30 may be set to any position, and the hub 50 moved away from these disks by reason of the fact that the arm 53 may spring upwardly to permit the end 54 to ride over these disks, so that the mechanism may be set for operation regardless of the position of the disks. Moreover, when the first or "on" disk 25 permits the end 54 of the arm to pass through the notch 26, the end of this arm will then engage the adjacent face of the second disk 30, and prevent further movement of the hub 50 until the arm comes into registration with the notch 31.

While I have shown and described a preferred embodiment of my invention, it will be understood that it is not to be limited to all of the details shown, but is capable of modification and variation within the spirit of the invention and within the scope of the appended claims.

What I claim is:

1. In a timer, a pair of rotatable disks each having a peripheral slot therein, means for manually rotating said disks to set each in a predetermined position, a power operated rotatable element, an arm carried by said element projecting toward said disks, means on the end of said arm adapted to enter said slots when in registration therewith and said means being yieldable outwardly to ride over the edges of said disks in one direction when the said means is not in registration with said slots, means mounting said element for axial movement, means urging said element axially toward said disks, and a controlling member actuated by the axial movements of said element.

2. In a timer, a power operated rotatable element, said element also being axially movable, means to effect successive axial movements of said member in the same direction comprising a pair of disks, said element having a part normally abutting said disks but freed therefrom by rotation of said element, and a movable controlling member, the movement of which is controlled by axial movements of said element.

3. In a timer, a power operated rotatable element, said element also being axially movable, means to effect successive axial movements of said members comprising a pair of axially spaced disks, said element having a part normally abutting said disks but being freed therefrom by rotation of said element, and a controlling member the movement of which is controlled by axial movements of said element, said part comprising a spring pressed member projecting toward the disks and the latter each having a slot therein to receive said member when registering therewith.

4. In a timer, a power operated rotatable element, said element also being axially movable, means to effect successive axial movements of

161 TIME CONTROLLING MECHANISM

Search Room said element comprising a pair of disks, said element having a part normally abutting said disks but being freed therefrom by rotation of said element, and a movable controlling member the movement of which is controlled by the axial movements of said element, said part comprising a spring pressed member projecting toward the disks, and the latter each having a slot therein to receive said member when registering therewith, said element being free for continued rotation relatively to said disks in any position of the latter, and means to rotate each of said disks to vary the position of the slots therein about the axis of said element.

5. In a timer, a power operated rotatable element, said element also being axially movable, means to effect successive axial movements of said member comprising a pair of disks, said element having a part normally abutting said disks but being freed therefrom by rotation of said element and a movable controlling member, the movement of which is controlled by the axial movements of said element, said controlling member comprising a rotatable shaft, and means connecting said element to said shaft to effect a step-by-step movement of the latter.

6. In a timer, a power operated rotatable element, said element also being axially movable, means to effect successive axial movements of said member comprising a pair of disks, said element having a part normally abutting said disks but being freed therefrom by rotation of said element, a lever actuated by the said element, a control member comprising a rotatable shaft having a plurality of spaced arms and said lever having a part normally lying in the path of said arms but moved therefrom by axial movement of said element.

7. In a timer, a power operated rotatable element, said element also being axially movable, means to effect successive axial movements of said member comprising a pair of disks, said element having a spring pressed part normally abutting said disks but being freed, by the rotation of said element, from all further contact with said disks during continued rotation of the element.

8. In a timer, a power operated rotatable element, said element also being axially movable, means to effect successive axial movements of said member comprising a pair of stop members, said element having a part adapted to be engaged and released first by one member and then by the other to permit successive axial movements of said element in the same direction, and a movable controlling member, the movement of which is controlled by axial movement of said element.

9. Means for operating a control member in a step-by-step movement, comprising a shaft, an actuating element rotatably and slidably mounted on the said shaft, means for rotating said element, means operatively connecting said element to the control member to control movement of the latter, and means for effecting step-by-step movement of said actuating element along said shaft comprising settable means rotatable with respect to said shaft, and a part on said element adapted to be engaged and released by said settable means.

10. Means for operating a control member in a step-by-step movement, comprising a shaft, an actuating element rotatably and slidably mounted on the said shaft, means for rotating said element, means operatively connecting said element to the control member to control movement of the latter, and means for effecting step-by-step movement of said actuating element along said shaft comprising settable means rotatable with respect to said shaft, and a part on said element adapted to be engaged and released by said settable means, said control member comprising a rotatable element having an arm projecting therefrom and said connecting means comprising a member having a part lying in the path of said arm and moved therefrom by axial movement of the actuating element.

11. Means for operating a control member in a step-by-step movement, comprising a shaft, an actuating element rotatably and slidably mounted on said shaft, means for rotating said element, means operatively connecting said element to the control member to control movement of the latter, and means for effecting step-by-step movement of said actuating element along said shaft comprising settable means rotatable with respect to said shaft, and a part on said element adapted to be engaged and released by said settable means, said part comprising a resilient member extending in a direction generally parallel to the shaft and having an inwardly turned end portion to engage said settable means.

12. Means for operating a control member in a step-by-step movement, comprising a shaft, an actuating element rotatably and slidably mounted on the said shaft, means for rotating said element, means operatively connecting said element to the control member to control movement of the latter, and means for effecting step-by-step movement of said actuating element along said shaft comprising settable means rotatable with respect to said shaft, and a part on said element adapted to be engaged and released by said settable means, said settable means comprising a disk having a peripheral opening therein, said part comprising a spring arm the body portion of which lies beyond the edge of the disk, and said arm having a turned end portion to engage the disk except when registering with said opening.

13. A timing mechanism having a power control element movable to two separate positions, a pair of superposed indicating members, said members being normally stationary during the operation of the timing mechanism but rotatably movable independently to setting positions, means cooperating with said members for moving said control element at times predetermined by the setting of said members, one of said members having an indicating means thereon to designate the time of movement of said element to power-on position, the other of said members having indicating means thereon to designate the time of movement of said element to power-off position, the inner of said members being in the form of a disk, and the outer of said members having a portion thereof cut away to expose a sector-shaped portion of said disk, the indicating means on the outer member being at one lateral edge of the cut-away portion thereof whereby the area of the inner member exposed between said two indicating means indicates the time elapsing between said movements.

14. A timing mechanism having a power control element movable to two separate positions, a pair of superposed indicating members, said members being normally stationary during the operation of the timing mechanism but rotatably movable independently to setting positions, means cooperating with said members for moving said control element at times predetermined by the setting of said members, one of said members having an indicating means thereon to designate the time of movement of said element to power-on position, the other of said members having indicating means thereon to designate the time of movement of said element to power-off position, the inner of said members being in the form of a disk, and the outer of said members having a portion thereof cut away to expose a sector-shaped portion of said disk, the indicating means on the outer member being at one lateral edge of the cut-away portion thereof whereby the area of the inner member exposed between said two indicating means indicates the time elapsing between said movements, a portion of said inner member adjacent the indicating means being colored to contrast with the remainder, and a part of said colored portion being exposed between the indicating means on the respective members when they are rotatably displaced.

15. A timing mechanism having a power control element movable to two separate positions, a pair of superposed indicating members, said members being normally stationary during the operation of the timing mechanism but rotatably movable independently to setting positions, means cooperating with said members for moving said control element at times predetermined by the setting of said members, one of said members having an indicating means thereon to designate the time of movement of said element to power-on position, the other of said members having indicating means thereon to designate the time of movement of said element to power-off position, the inner of said members being in the form of a disk, and the outer of said members being of the form of a sector to expose a sector-shaped portion of said disk, the indicating means on the outer member being at one lateral edge thereof whereby the area of the inner member exposed between said two indicating means indicates the time elapsing between said movements.

16. A timing mechanism having a power control element movable to two separate positions, a pair of superposed indicating members, said members being normally stationary during the operation of the timing mechanism but rotatably movable independently to setting positions, means cooperating with said members for moving said control element at times predetermined by the setting of said members, one of said members having an indicating means thereon to designate the time of movement of said element to power-on position, the other of said members having indicating means thereon to designate the time of movement of said element to power-off position, the inner of said members being in the form of a disk, and the outer of said members being of the form of a sector to expose a sector-shaped portion of said disk, the indicating means on the outer member being at one lateral edge thereof whereby the area of the inner member exposed between said two indicating means indicates the time elapsing between said movements, and a portion of the area of said inner member adjacent the indicating means thereon being colored to contrast with the remainder whereby the portion exposed between said two indicating means will be readily discernible.

17. A timing mechanism according to claim 13, wherein the mechanism is provided with a clock face having a dial with time indications thereon, and the indicating means provided on said members cooperate with said time indications on said dial to indicate the times of said movements.

18. A timing mechanism according to claim 14, wherein said mechanism is provided with a clock face having a dial with time indications thereon, and said exposed colored portion of the inner member cooperates with the time indications on said dial to indicate thereon the time elasping between said movements.

FREDERICK LUX.